US012480645B2

(12) United States Patent
Teetzel et al.

(10) Patent No.: US 12,480,645 B2
(45) Date of Patent: Nov. 25, 2025

(54) HELMET MOUNTED MULTISPECTRAL ILLUMINATION DEVICE

(71) Applicant: WILCOX INDUSTRIES CORP., Newington, NH (US)

(72) Inventors: James W. Teetzel, Portsmouth, NH (US); Elliott S. Turner, Newmarket, NH (US); Robert E. Riel, Raymond, NH (US); Robert A. Wells, Newmarket, NH (US)

(73) Assignee: Wilcox Industries Corp., Newington, NH (US)

( * ) Notice: Subject to any disclaimer, the term of this patent is extended or adjusted under 35 U.S.C. 154(b) by 0 days.

(21) Appl. No.: 18/943,390

(22) Filed: Nov. 11, 2024

(65) Prior Publication Data

US 2025/0155109 A1 May 15, 2025

Related U.S. Application Data

(60) Provisional application No. 63/548,481, filed on Nov. 14, 2023.

(51) Int. Cl.
*F21V 21/084* (2006.01)
*F21V 21/32* (2006.01)
(Continued)

(52) U.S. Cl.
CPC ............ *F21V 21/084* (2013.01); *F21V 21/32* (2013.01); *F21V 23/04* (2013.01); *F21V 33/0008* (2013.01); *F21Y 2113/13* (2016.08)

(58) Field of Classification Search
CPC .... F21V 21/084; F21V 21/32; F21V 33/0008; F21V 23/04; F21L 4/04
(Continued)

(56) References Cited

U.S. PATENT DOCUMENTS 7,467,875 B1 * 12/2008 Rama .................... G02B 6/0008
362/198
8,403,515 B2 * 3/2013 Eichelberger ........... F21V 21/30
362/198
(Continued)

FOREIGN PATENT DOCUMENTS

EP 4520211 A1 3/2025

OTHER PUBLICATIONS

Extended European Search Report in European Application No. 24210044.4 dated Mar. 17, 2025, 9 pages.

*Primary Examiner* — Thomas M Sember
(74) *Attorney, Agent, or Firm* — McLane Middleton, Professional Association

(57) ABSTRACT

A multispectral illumination device includes a main housing configured to be secured to a helmet and an illuminator head comprising a plurality of light sources, the plurality of light sources operable to emit light in multiple spectral regions. A selector is located on the main housing for actuating one or more of the light sources within the plurality of light sources that emit light in a selected one of the multiple spectral regions. A stalk passes through an opening in the main housing and has a first end coupled to the illuminator head and a second end opposite the first end received within the main housing. The stalk is slidable within the opening in the main housing to extend and retract the illuminator head toward and away from the housing, the stalk being slidable between a fully extended position and a fully retracted position.

29 Claims, 21 Drawing Sheets

(51) Int. Cl.
*F21V 23/04* (2006.01)
*F21V 33/00* (2006.01)
*F21Y 113/13* (2016.01)

(58) Field of Classification Search
USPC .............................. 362/105, 106, 198, 418
See application file for complete search history.

(56) References Cited

U.S. PATENT DOCUMENTS

| | | | |
|---|---|---|---|
| 11,746,998 B1 * | 9/2023 | Ernst | ................... F21V 21/0816 |
| | | | 362/618 |
| 2006/0221604 A1 | 10/2006 | Martin et al. | |
| 2014/0009920 A1 | 1/2014 | Swan et al. | |
| 2015/0176782 A1 * | 6/2015 | McLennan | .............. F21L 4/045 |
| | | | 362/183 |
| 2021/0222842 A1 | 7/2021 | Sharrah et al. | |
| 2024/0164464 A1 | 5/2024 | Teetzel et al. | |
| 2024/0349837 A1 | 10/2024 | Teetzel et al. | |

\* cited by examiner

HELMET MOUNTED MULTISPECTRAL ILLUMINATION DEVICE

CROSS-REFERENCE TO RELATED APPLICATION

This application claims the priority benefit of U.S. provisional application No. 63/548,481 filed Nov. 14, 2023. The aforementioned application is incorporated herein by reference in its entirety.

BACKGROUND

The present invention relates to a helmet mounted illumination device and, in particular, to a multispectral illumination device (MID) configured to be worn on the head of a user.

SUMMARY

The multispectral illumination device in accordance with this disclosure is a head borne light mounted to an adjustable gooseneck fixture that can be extended from and retracted into a housing. The multispectral illumination device hosts a plurality of light sources which emit at different spectral regions. In certain embodiments, the multispectral illumination device has light sources which emit white light, red light, ultraviolet (UV) light, near infrared (NIR) light, and short ware infrared (SWIR) light. For example, white light is visible light that appears as a balanced combination of different colors across the visible spectrum, which can be achieved through various means, including incandescent sources and LEDs with red, green, and blue (RGB) components. White light facilitates general visibility. Red light provides visibility while maintaining dark adaptation in low-light settings. UV light may be used for forensic imaging, fluorescent detection, or for tracking, identifying, or marking friendly forces, among other tactical or operational purposes. NIR light and SWIR provide infrared illumination for night vision in the NIR and SWIR ranges, respectively, which allows soldiers to maintain a low profile and avoid revealing their position.

It will be recognized that the light sources in the illustrated embodiment are exemplary only and nonlimiting and that the multispectral illumination device can be configured with emitters in various spectral regions to accommodate a diverse array of applications. The specific choice of spectral regions can be customized to match the requirements of a given application or mission. In embodiments, control is accomplished via rotation knob with a built-in safety feature to reduce the risk of accidental emissions. In embodiments, the light source activated by the selectable positions on the control knob is user configurable using an associated application on a smartphone or other mobile device.

In one aspect, a multispectral illumination device includes a main housing configured to be secured to a helmet and an illuminator head comprising a plurality of light sources, the plurality of light sources operable to emit light in multiple spectral regions. A selector is located on the main housing for actuating one or more of the light sources within the plurality of light sources that emit light in a selected one of the multiple spectral regions. A stalk passes through an opening in the main housing and has a first end coupled to the illuminator head and a second end opposite the first end received within the main housing. The stalk is slidable within the opening in the main housing to extend and retract the illuminator head toward and away from the housing, the stalk being slidable between a fully extended position and a fully retracted position.

In a further aspect, a helmet system is provided comprising a helmet in combination with a multispectral illumination device in accordance with this disclosure.

Various advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation of the invention, not limitation of the invention, which may be embodied in various forms. Therefore, specific structural and functional details disclosed herein are not to be interpreted as limiting but merely as a basis for the claims and as a representative basis for teaching one skilled in the art to variously employ the present inventive concept in virtually any appropriately detailed structure. Further, the terms and phrases used herein are not intended to be limiting but rather to provide an understandable description of the present development. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

The terms "a" or "an," as used herein, are defined as one or more than one. The term "another," as used herein, is defined as at least a second or more. The terms "including" and/or "having" as used herein, are defined as comprising (i.e., open transition). The term "coupled" or "operatively coupled," as used herein, is defined as indirectly or directly connected.

As used in this application, the terms "front," "rear," "upper," "lower," "upwardly," "downwardly," "left," "right," and other orientation descriptors are intended to facilitate the description of the exemplary embodiment(s) of the present invention, and are not intended to limit the structure thereof to any particular position or orientation.

All numbers herein are assumed to be modified by the term "about," unless stated otherwise. The recitation of numerical ranges by endpoints includes all numbers subsumed within that range (e.g., 1 to 5 includes 1, 1.5, 2, 2.75, 3, 3.80, 4, and 5).

Figure 1:
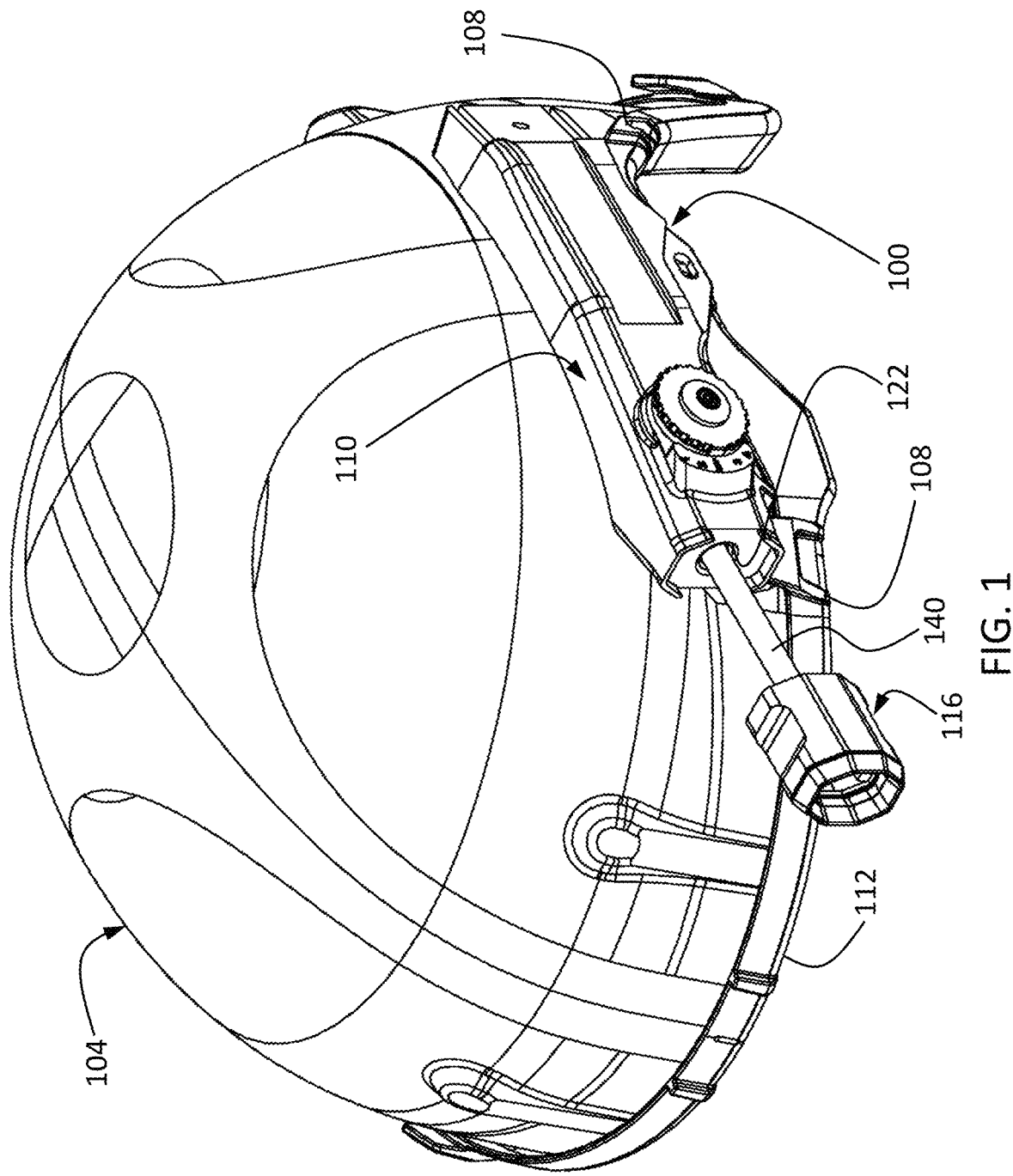
FIG. 1 is an isometric view of a multispectral illumination device in accordance with an exemplary embodiment attached to the side of a helmet, with the retractable stalk in the extended position.

Referring now to the drawings, wherein like reference numbers refer to like or analogous components throughout the several views, FIG. 1 shows a multispectral illumination device 100 attached to the right side (user's left side) of a helmet 104. It will be recognized that the unit 100 can also be adapted for attachment to the left side (user's right side) of the helmet 104. In the illustrated embodiment, the unit 100 is secured helmet 104 via hooks 108 engaging a brim portion 112 of the helmet 104. One or more fastener elements, such as threaded fasteners engages tapped openings or inserts on the helmet, may also be employed. The unit 100 includes a main housing 110.

Figure 2:
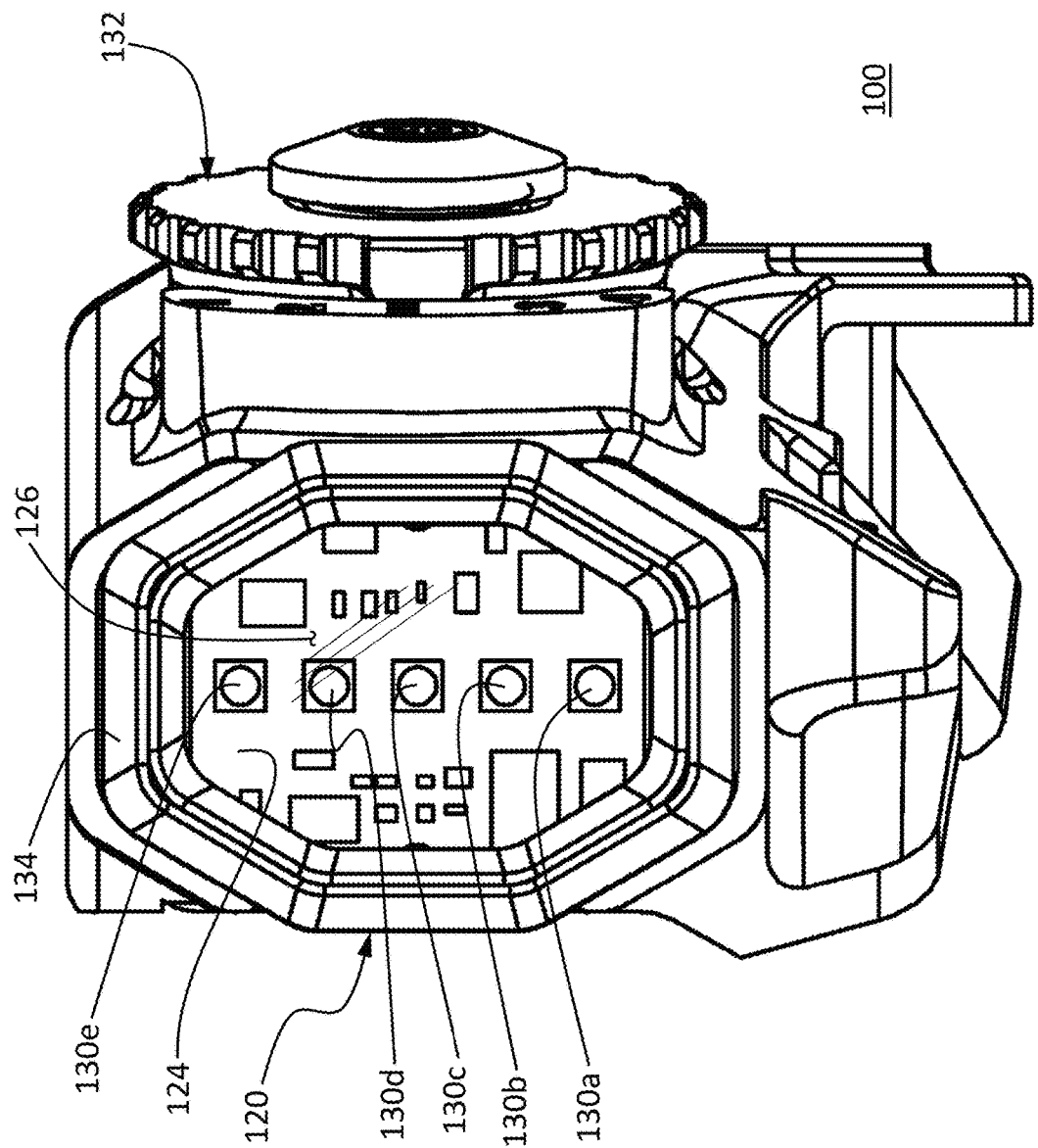
FIG. 2 is an enlarged front view of the multispectral illumination device appearing in FIG. 1.

As shown in FIG. 2, the unit 100 includes an illuminator head 116 which includes an illuminator head housing 120 enclosing an illuminator head circuit board 124. The circuit board 124 includes a plurality (five in the illustrated embodiment) of light sources 130a-130e, and associated driver circuitry as would be understood by persons skilled in the art. In embodiments, the light sources are LEDs and LED driver circuitry may be provided to adjust brightness or output intensity. In embodiments the drivers are configured to adjust brightness level by modulating the on-off duty cycle of the emitters, e.g., using pulse width modulation (PWM).

In certain embodiments, the light sources 130a-130e include one or more white light emitters, one or more red light emitters, one or more UV light emitters, one or more NIR light emitters and one or more SWIR light emitters. In preferred embodiments, the lights sources are LED light sources. A rotary control knob assembly 132 is provided on the housing 110 for selectively activating a desired one of the light sources 130a-130e. A transparent optical cover or lens 126 may be provided over the circuit board 124 and retained on the housing 120 with a bezel 134.

Figure 3:
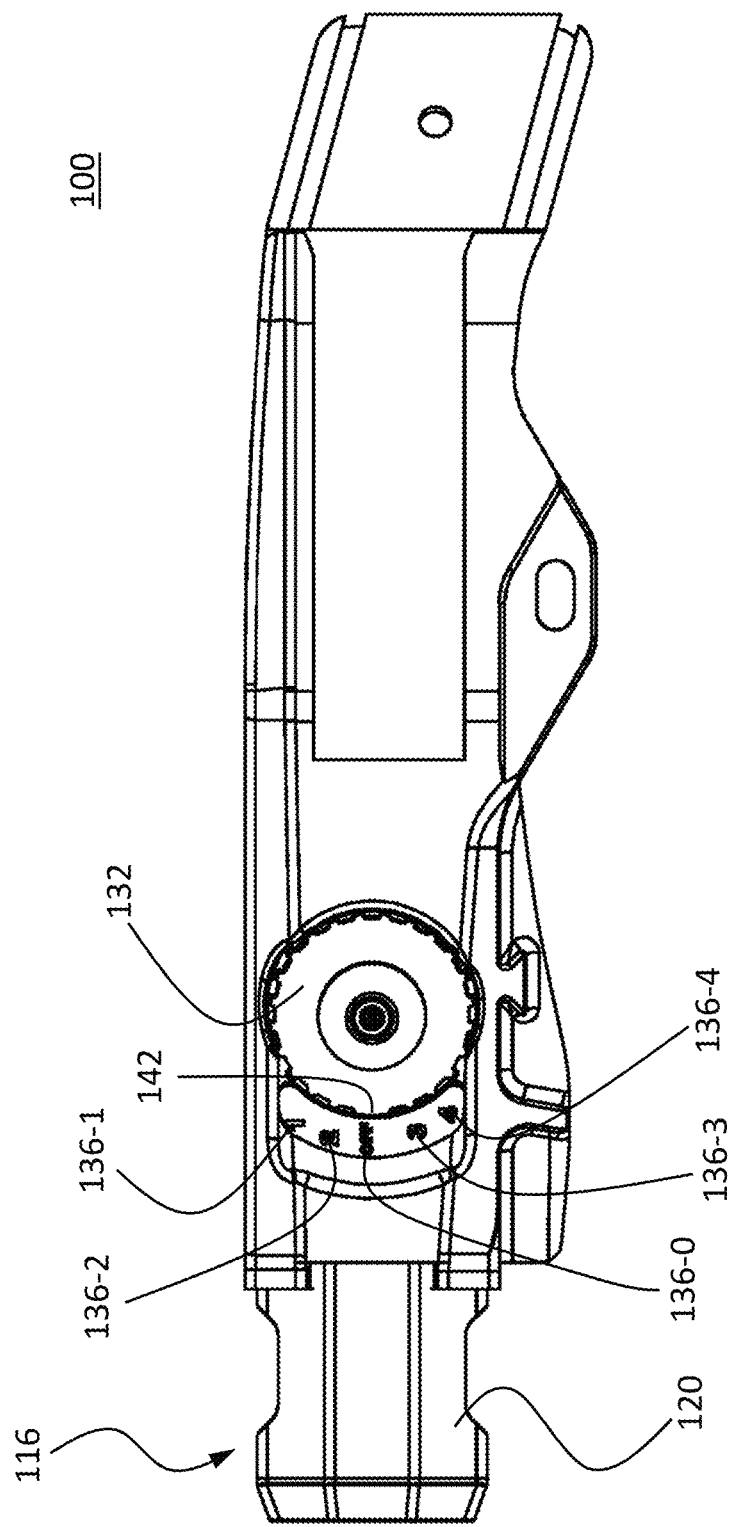
FIG. 3 is an enlarged right side view of the multispectral illumination device appearing in FIG. 1, with the retractable stalk in the retracted position.
Figure 4:
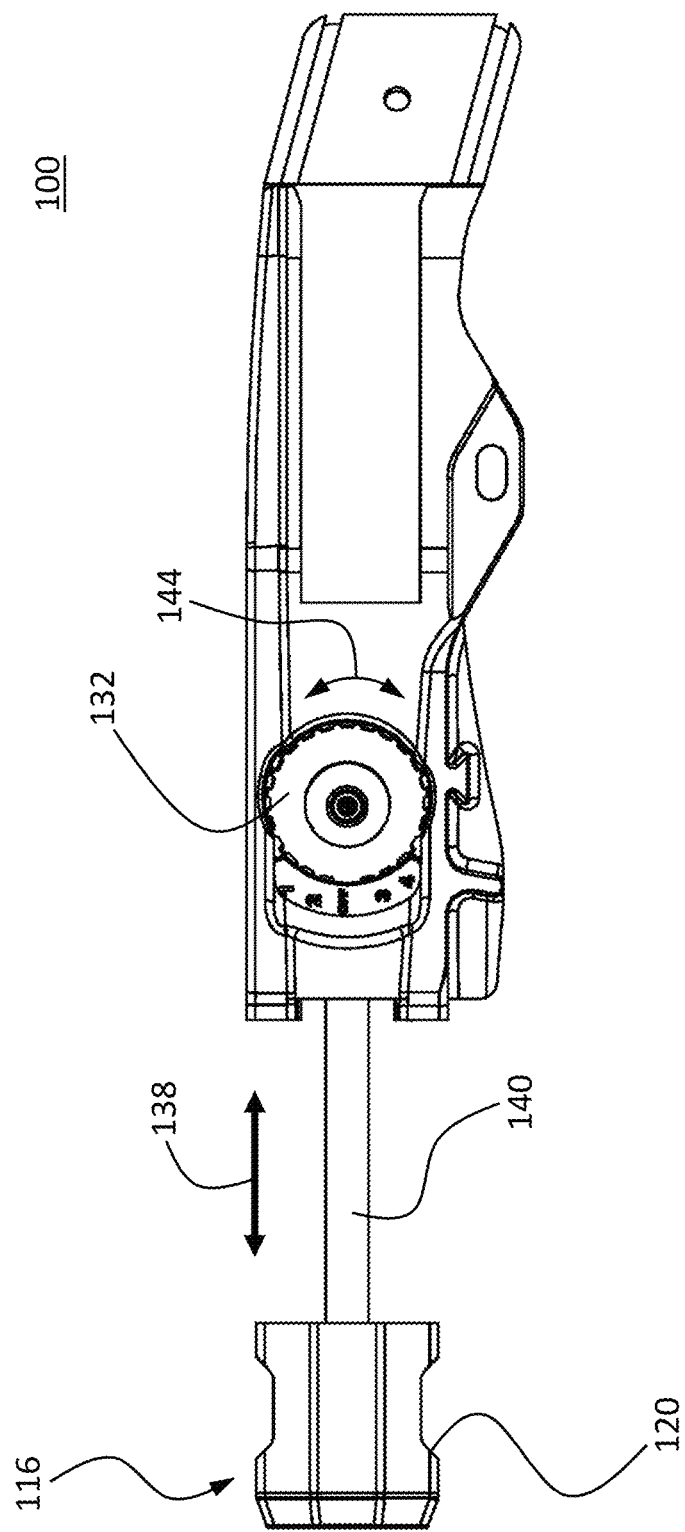
FIG. 4 is an enlarged right side view of the multispectral illumination device appearing in FIG. 1, with the retractable stalk in the extended position.

As shown in FIGS. 3 and 4, the illuminator head 116 is disposed at the distal end of a flexible stalk 140 which is slidable with respect to the housing 110 via an opening 122 and is movable between a retracted or stowed position (see FIG. 3) and an extended or deployed position (see FIG. 4), as indicated by the arrow 138.

The control knob 132 assembly includes a knob member 160 which is rotatable as indicated by the arrow 144. The knob member 160 includes an indicator portion 142, wherein the knob member 160 is rotatable to a selected one of a plurality of positions, designated 136-0, 136-1, 136-2, 136-3, and 136-4. Printed indicia may be printed on the housing 110 to assist in identifying the rotational positions and rotational selection thereof by alignment with the indicator portion 142. In certain embodiments, positive stops or detents are incorporated to secure the knob member 160 at each position 136-0-136-4 for preventing unintentional or inadvertent rotation.

In the illustrated embodiment, the position 136-0 is designated as the "off" position wherein none of the light sources 130a-130e are actuated. The positions 136-1 through 136-4 are designated as positions 1-4, respectively, wherein each position is user-programmable to actuate a desired one of the light sources 130a-130e. In embodiments, the programming process is performed through a mobile application wherein the user-defined settings will be stored in a memory associated with a processor on the circuit board 124.

Figure 20:
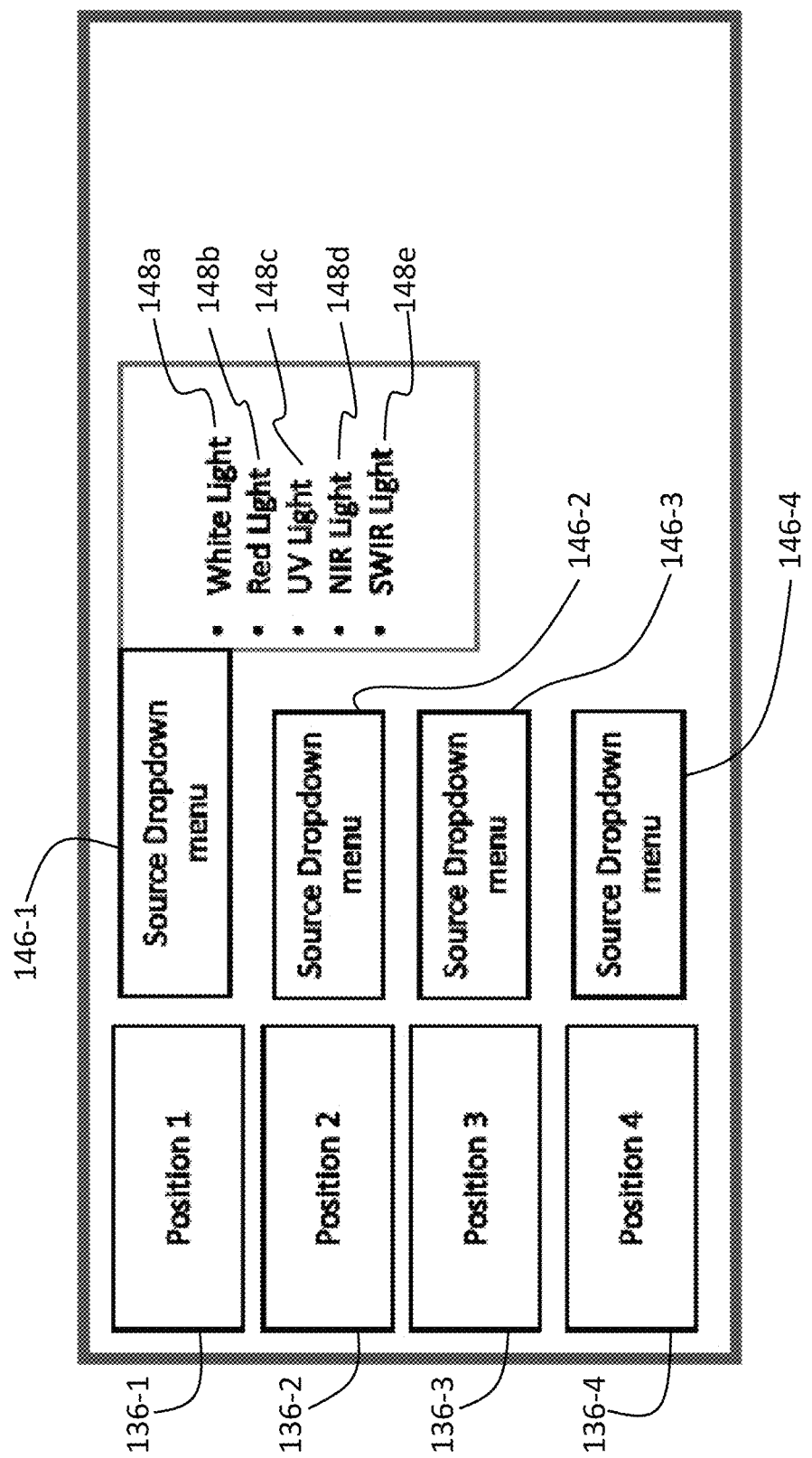
FIG. 20 is a block diagram illustrating a menu hierarchy for assigning a light source to each knob position 1-4.

An exemplary menu hierarchy for a programming interface is shown in FIG. 20. Each of the positions 136-1 through 136-4 have an associated. Each drop down menu, in turn has a menu item 148a-148e, associated with the respective light source 130a-130e.

Figure 21:
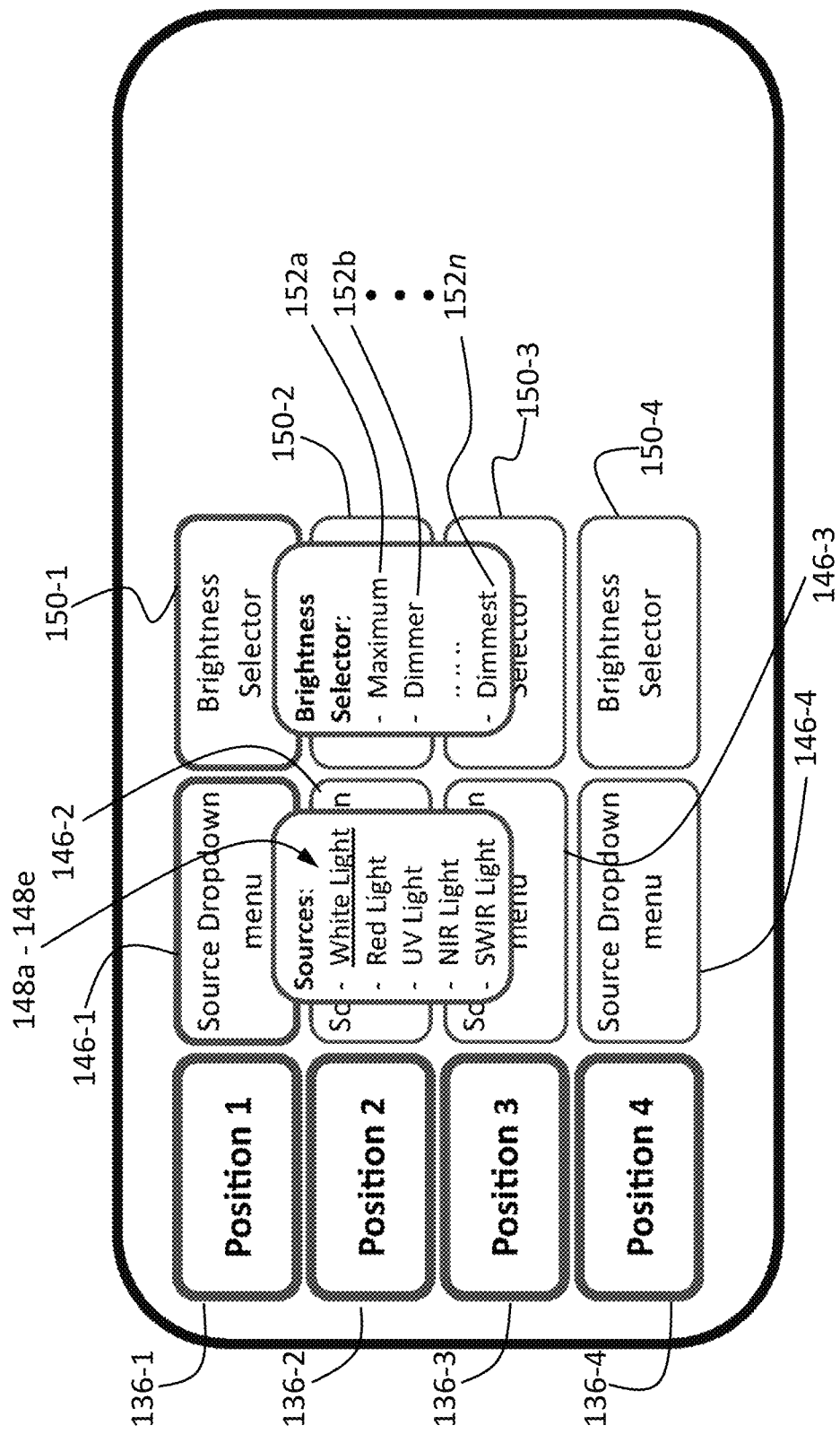
FIG. 21 is an exemplary user interface for assigning a light source to each knob position 1-4 and controlling brightness of each selected light source.

FIG. 21 shows an exemplary user interface, e.g. via a dedicated app on a smartphone, mobile device, smartwatch, or other computer based information handling system for programming the light sources associated with each of the selector positions 136-1-136-4, e.g., through a wireless interface such as Bluetooth or Wi-Fi. Each selector position has the associated drop down menus 146-1 through 146-4, respectively. For each drop down menu, 146-1 through 146-4, there is a list of menu items 148a-148e which correspond to the illumination sources 130a-130e, respectively. The exemplary embodiment illustrated in FIG. 21 includes an additional menu level 150-1 through 150-4 for programming the brightness level of the selected light source for a given knob position. Each menu level 150-1 through 150-4, in turn, includes a plurality of n user-selectable brightness levels 152a, 152b, up through 152n, wherein n is any number.

Figure 5:
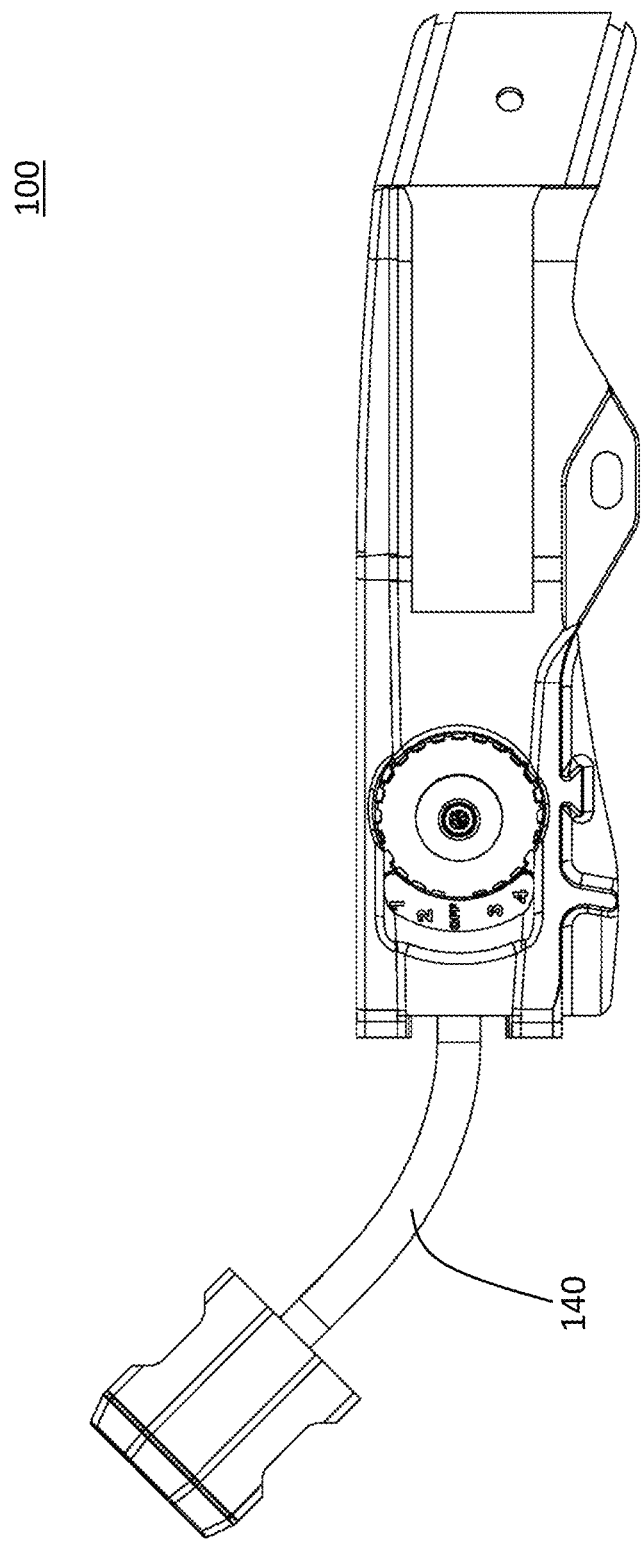
FIG. 5 is an enlarged right side view of the multispectral illumination device appearing in FIG. 1, with the retractable stalk in the extended position and articulated to point upward.
Figure 6:
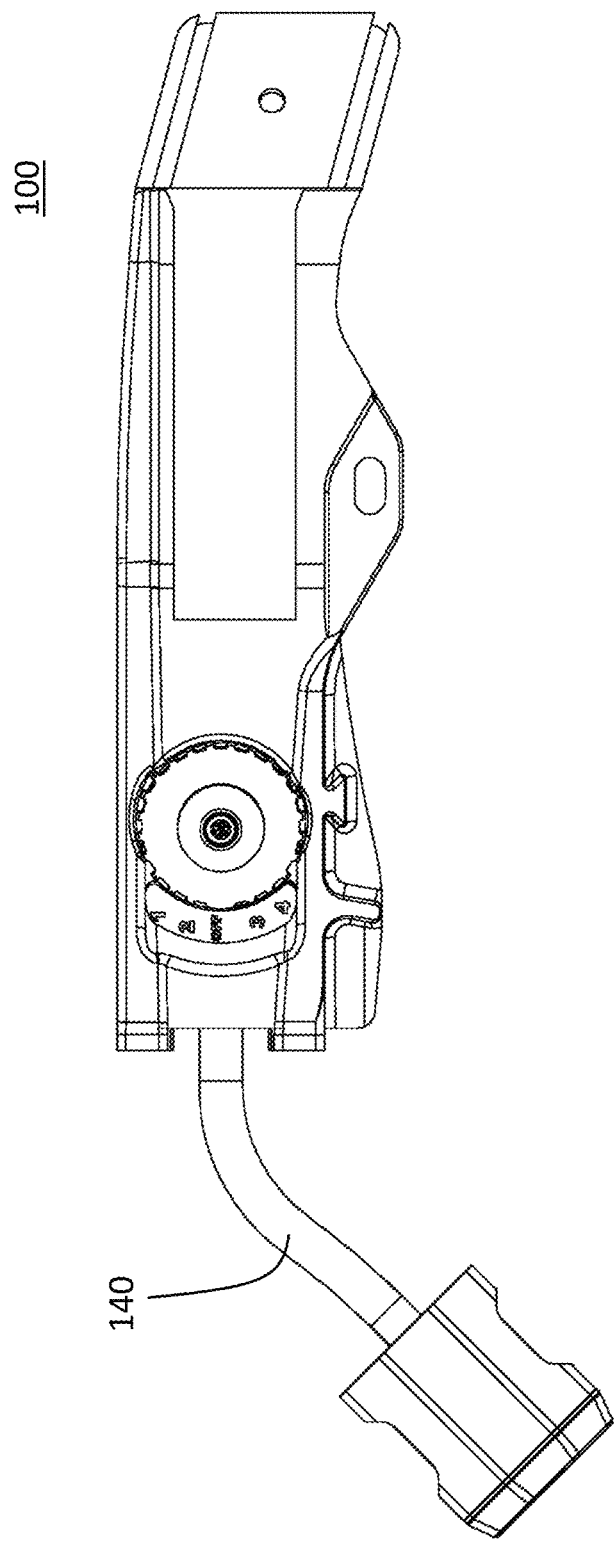
FIG. 6 is an enlarged right side view of the multispectral illumination device appearing in FIG. 1, with the retractable stalk in the extended position and articulated to point downward.
Figure 7:
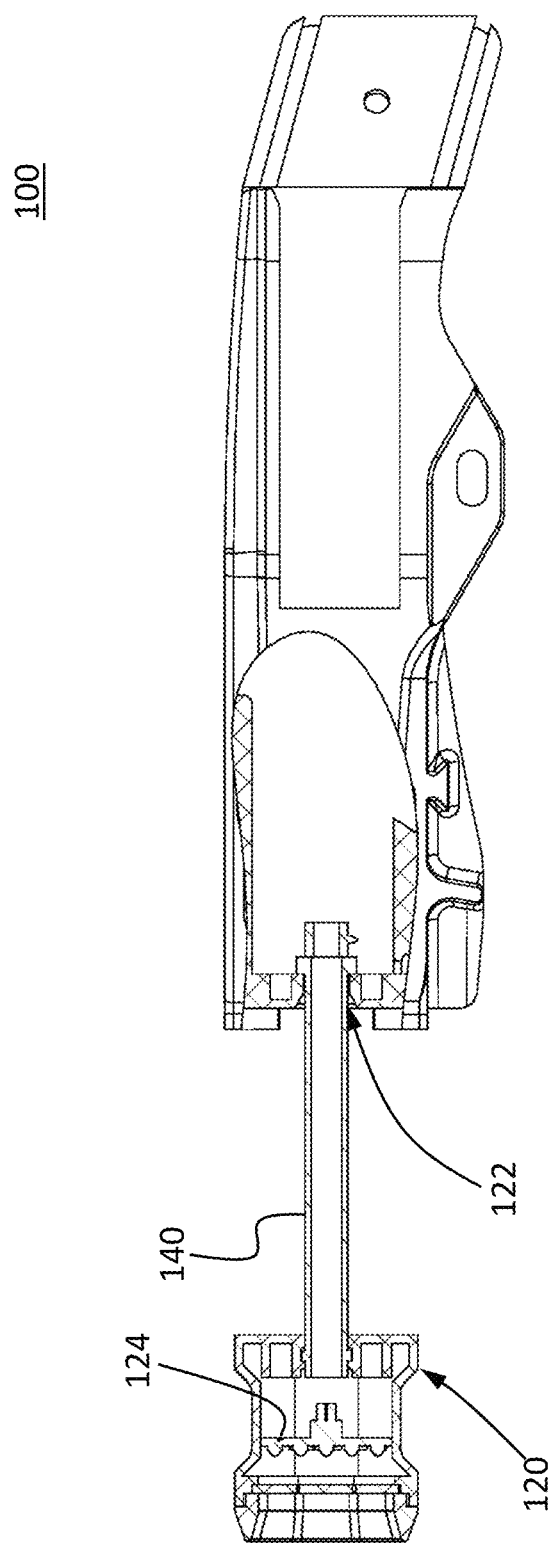
FIG. 7 is a right side cross-sectional view of the multispectral illumination device appearing in FIG. 1, with the retractable stalk in the extended position.

As best seen in FIGS. 5 and 6, the stalk 140 is flexible to allow it to be bent or articulated to aim the lighting head 120 at a desired angle. FIG. 5 depicts the unit 100 with the stalk 140 angled upward. FIG. 6 depicts the unit 100 with the stalk 140 angled downward. As best seen in FIG. 7, the stalk 140 is telescopically received within the aperture 122 formed in the housing 110. Advantageously, the stalk 140 is formed of an elongate, hollow, and flexible gooseneck structure, i.e., a coiled or helical tubular structure as are known in the art.

Figure 8:
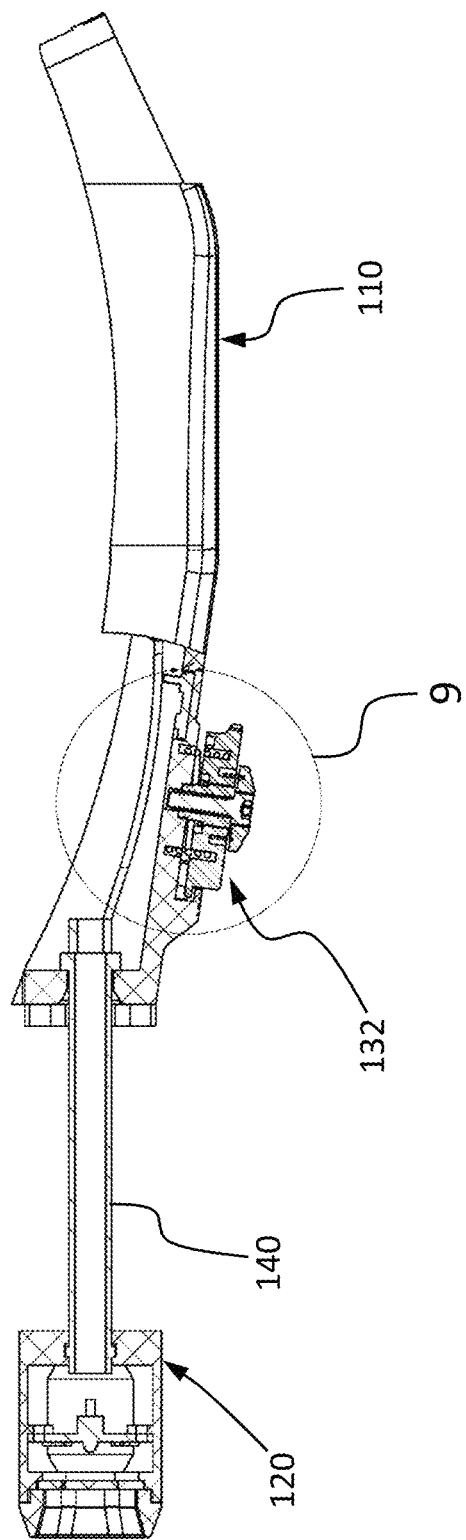
FIG. 8 is a top, partial cross-sectional view of the multispectral illumination device appearing in FIG. 1, with the retractable stalk in the extended position.
Figure 9:
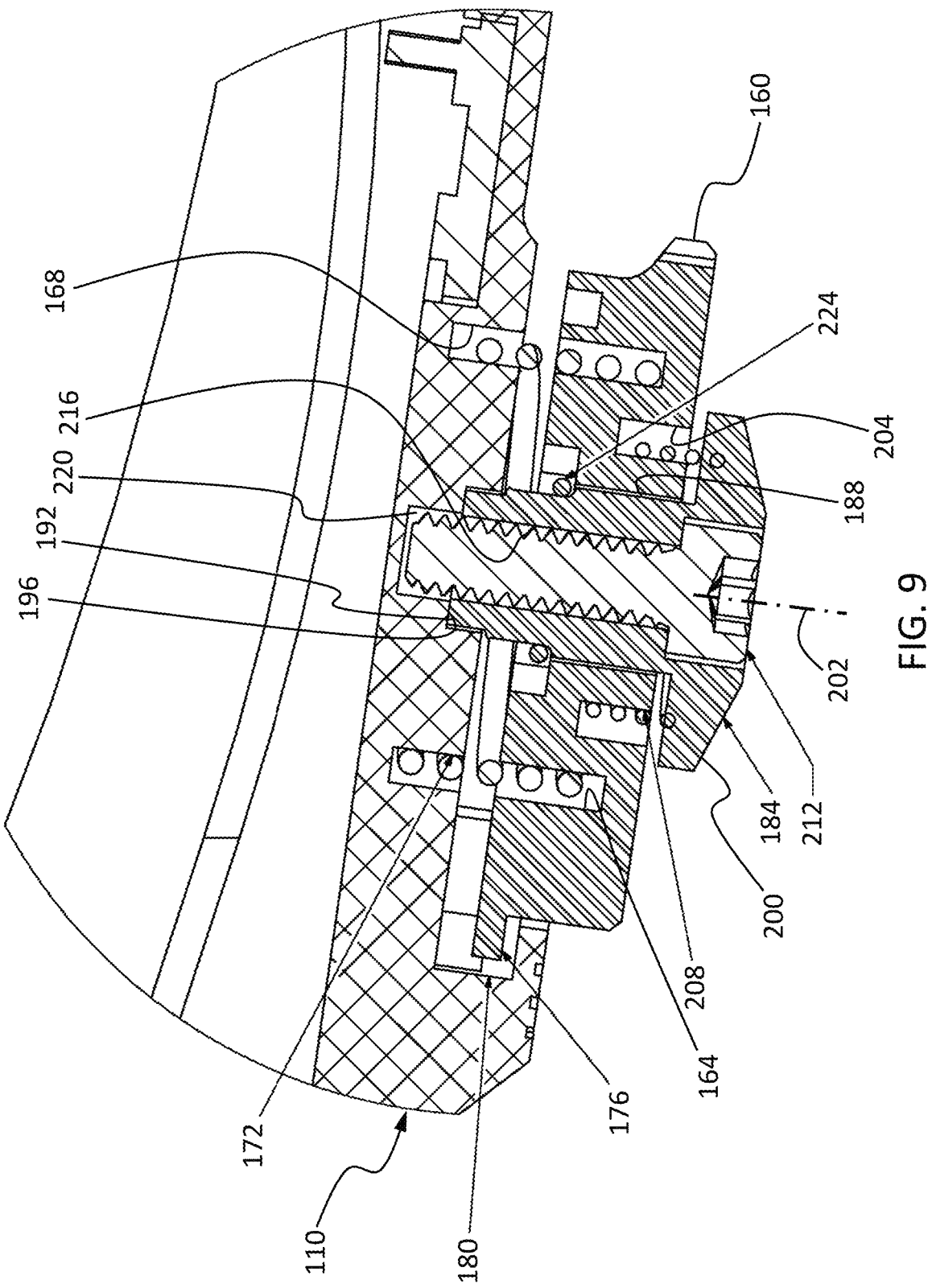
FIG. 9 is an enlarged view of the region 9 appearing in FIG. 8.

As best seen in FIGS. 8 and 9, the illustrated knob assembly 132 is configured to prevent inadvertent rotation, which may inadvertently cause an emission of light that may reveal the operator's presence or location. The knob assembly 132 includes a knob member 160 which includes a first cylindrical channel 164 formed in the inward facing surface of the knob member 160. The first cylindrical channel 164 is aligned with a like sized second cylindrical channel 168 on the housing 110. A bottom spring 172 is received within the first and second cylindrical channels 164 and 168, respectively. The bottom spring biases the knob member 160 away from the housing 110. The knob member 160 further includes a knob track guide member 176 which runs within a knob track 180 formed within the housing 110.

A knob positioning barrel 184 passes through a central opening 188 in the knob member 160. The knob positioning barrel 184 includes a distal end 192 which is received within a counterbore 196 formed in the housing 110. The knob positioning barrel 184 also includes a flanged or enlarged diameter proximal end 200 wherein the knob member 160 is retained between the housing 110 and the enlarged diameter proximal end 200 of the knob positioning barrel 184.

A third cylindrical channel 204 is concentric with the first cylindrical channel 164 and the central opening 188. The third cylindrical channel 204 is formed on the outward facing surface of the knob member 160. A top spring 208 is received within the third cylindrical channel 204 and bears against the enlarged diameter proximal end 200 of the knob positioning barrel 184. A knob assembly mounting screw 212 passes through a central opening 216 in the knob positioning barrel 184 and threadably engages a threaded bore 220 in the housing 110, rigidly affixing the knob positioning barrel 184 to the housing 110.

Figure 12:
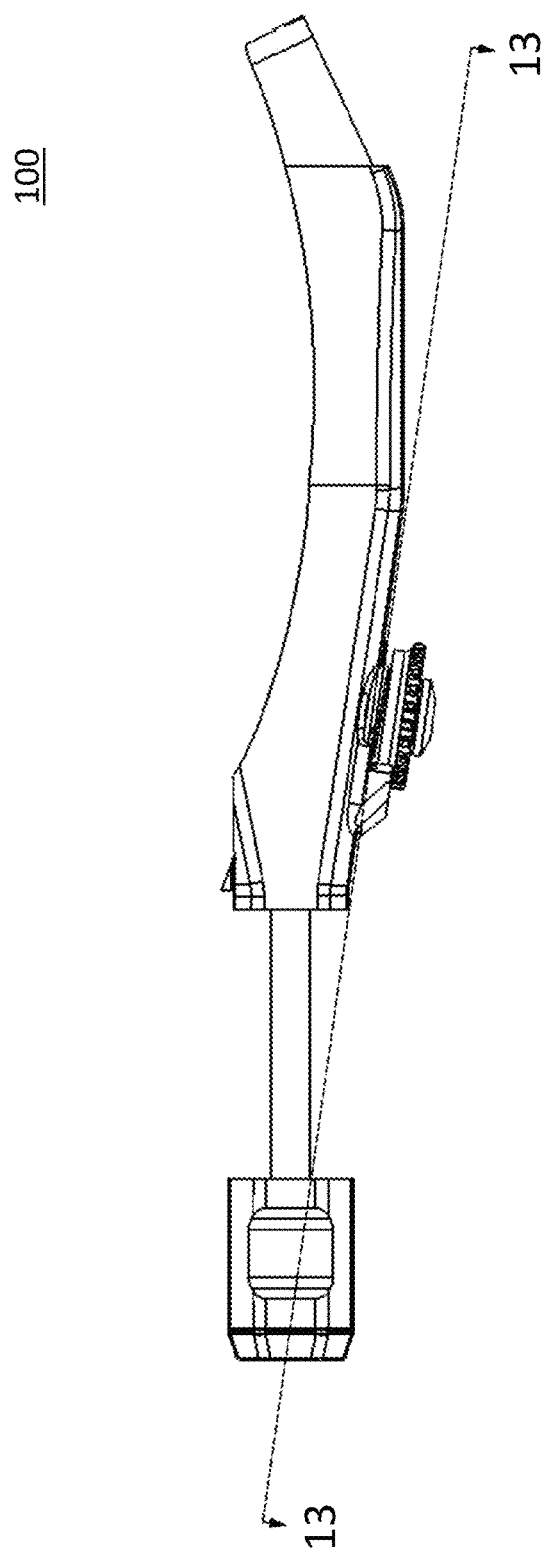
FIG. 12 is a top view of the multispectral illumination device appearing in FIG. 1, with the retractable stalk in the extended position.
Figure 13:
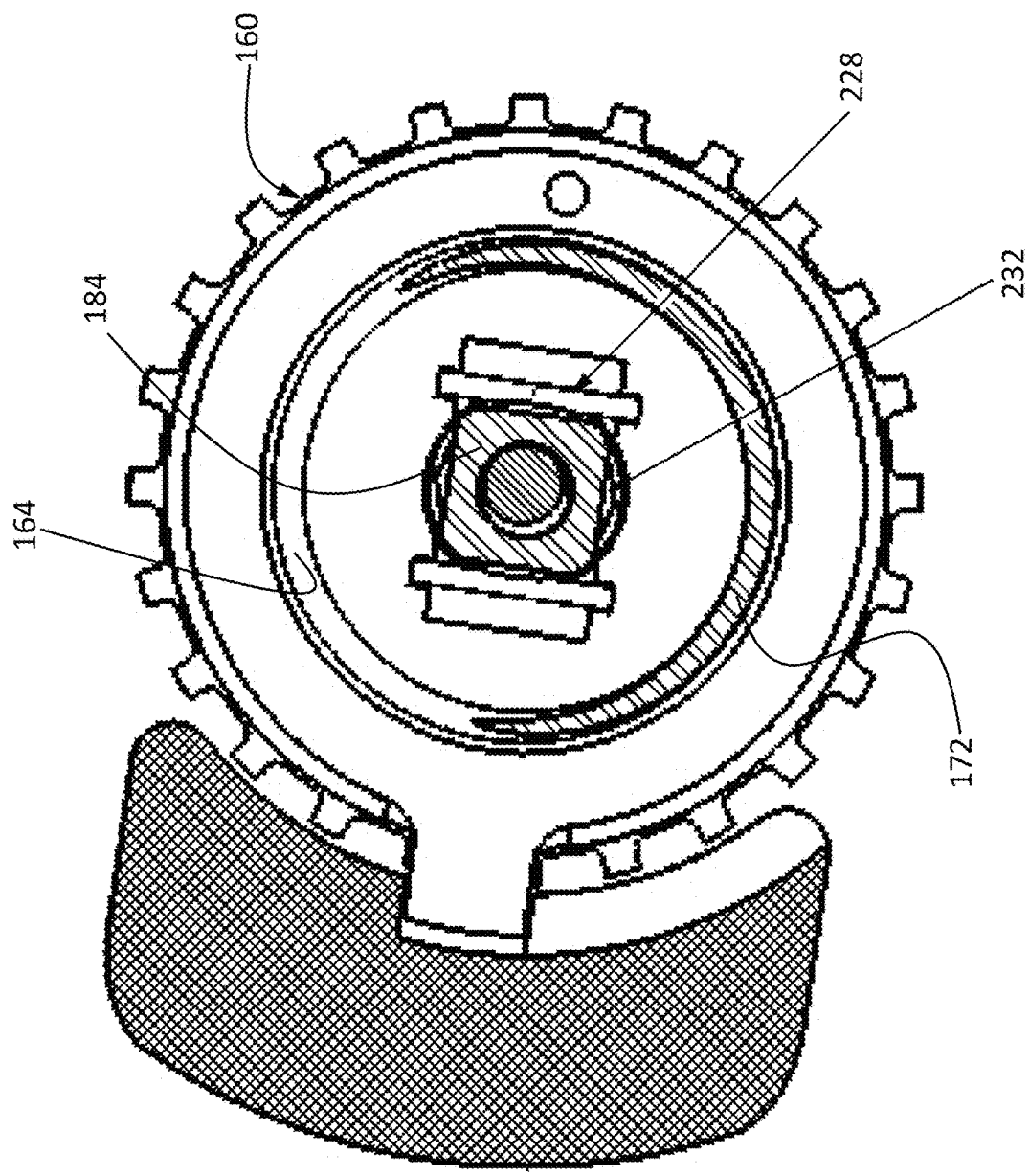
FIG. 13 is a cross-sectional view taken along the lines 13-13 appearing in FIG. 12.
Figure 14:
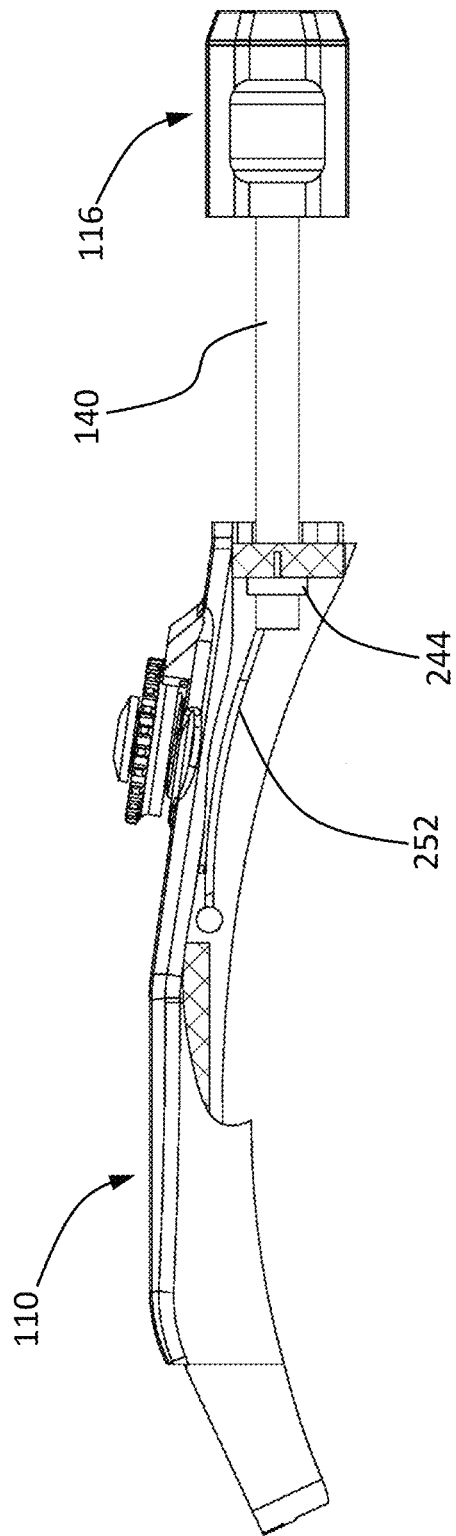
FIG. 14 is a bottom, partial cross-sectional view of the multispectral illumination device appearing in FIG. 1, with the retractable stalk in the extended position.
Figure 15:
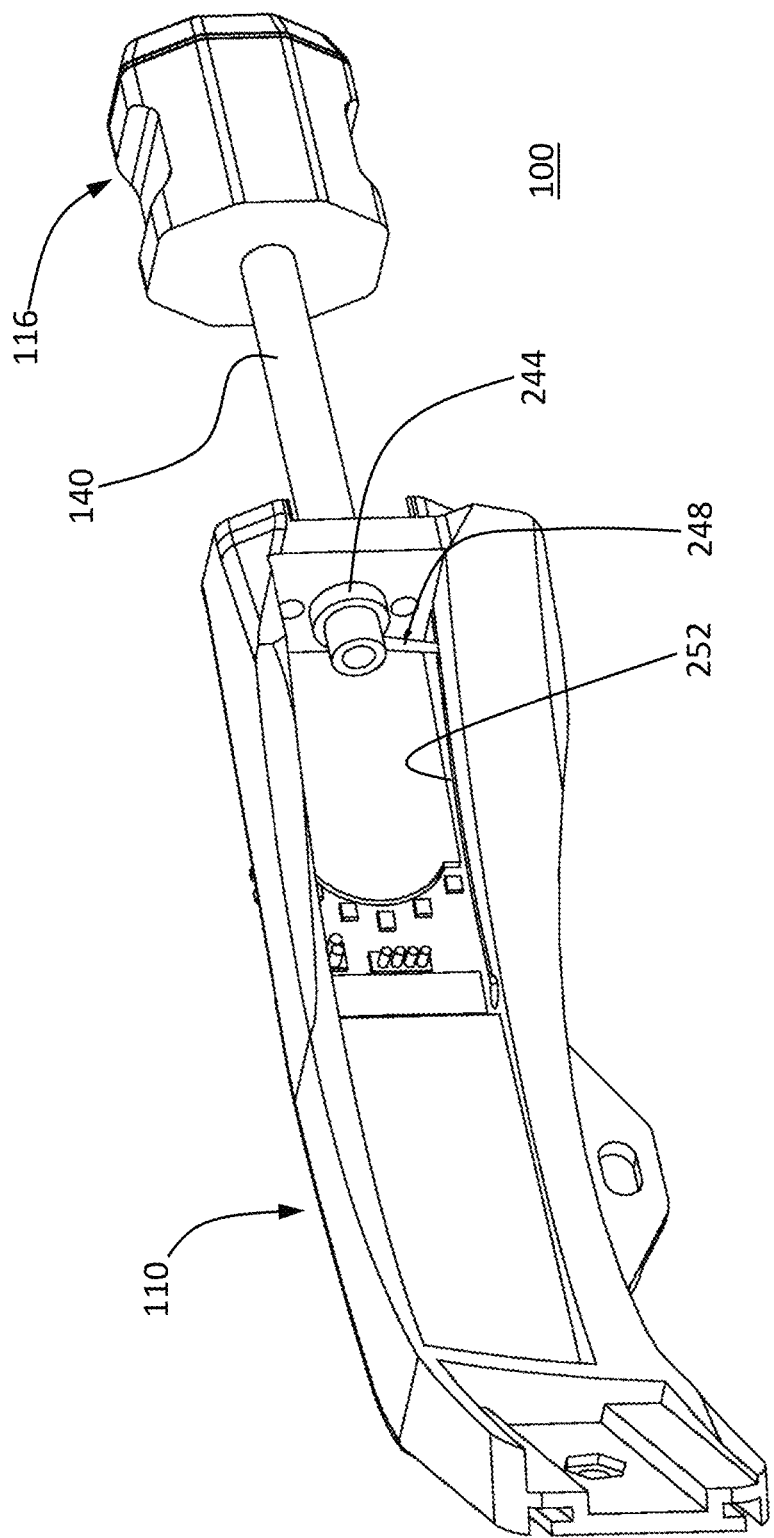
FIG. 15 is an isometric view of the multispectral illumination device appearing in FIG. 1, taken generally from the left side, with the retractable stalk in the extended position.
Figure 16:
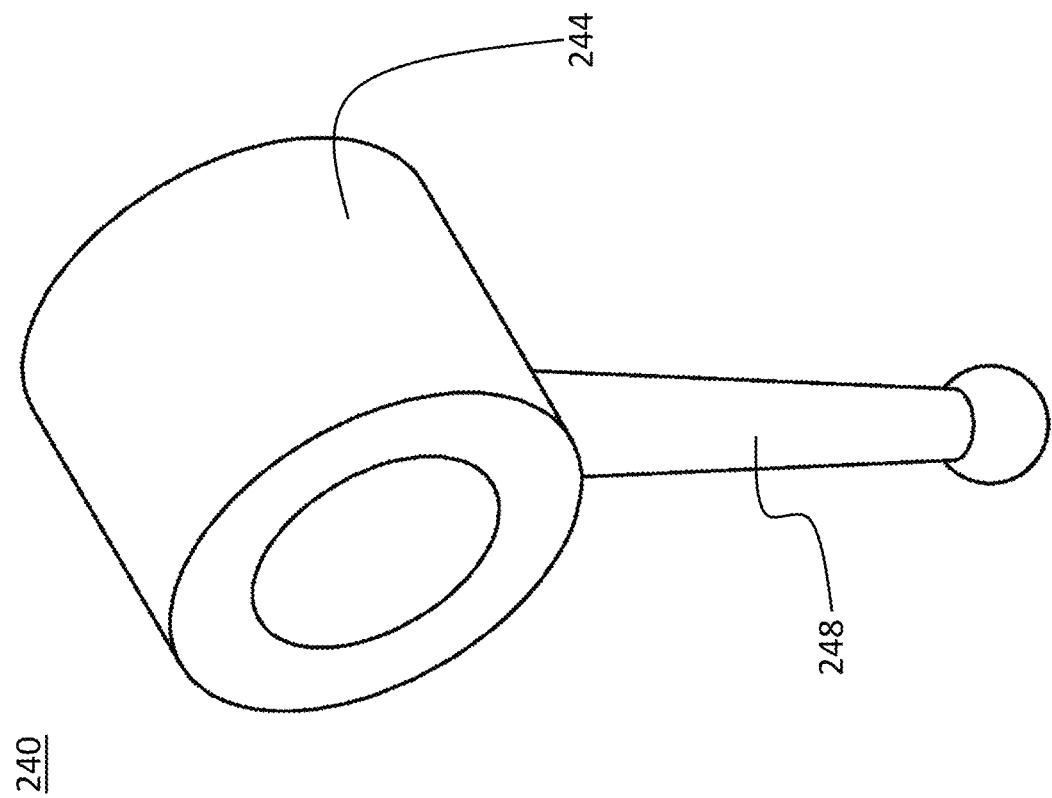
FIG. 16 is an enlarged view of an anti-rotation guide key for preventing rotation of the retractable stalk.
Figure 17:
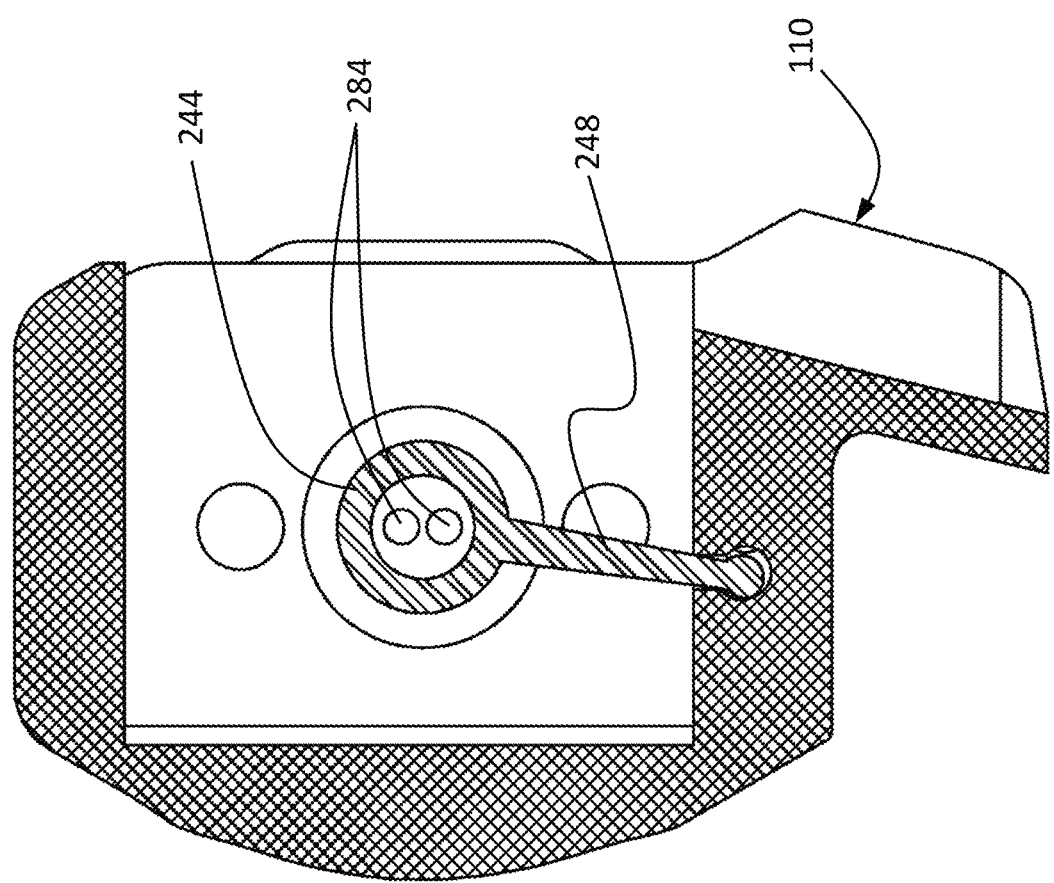
FIG. 17 is a rear cross-sectional view of the multispectral illumination device appearing in FIG. 1, illustrating the anti-rotation guide key and the anti-rotation track.

The top spring 208 urges or biases the knob member 160 toward the housing 110. The bottom spring 172 and top spring 208 are counteracting which force the knob member 160 to a natural position intermediate the housing 110 surface and the enlarged diameter proximal end 200 of the knob positioning barrel 184 when the knob member 160 is in the "Off" position. The knob member 160 can be displaced along a central axis 202 from the natural position by pushing the knob member 160 toward the housing 110, compressing the bottom spring 172. In addition, the knob member 160 also be displaced from the natural position by pulling the knob member 160 away from the housing 110, compressing the top spring 208. Knob rotation detents 224 are provided to secure the knob member 160 are each position 136-1 through 136-4. As best seen in FIGS. 12 and 13, the knob detents 224 axially secure the knob member 160 into each of the user-selectable positions. Leaf bar springs 228 act on flats 232 formed on the knob positioning barrel 184.

Figure 10:
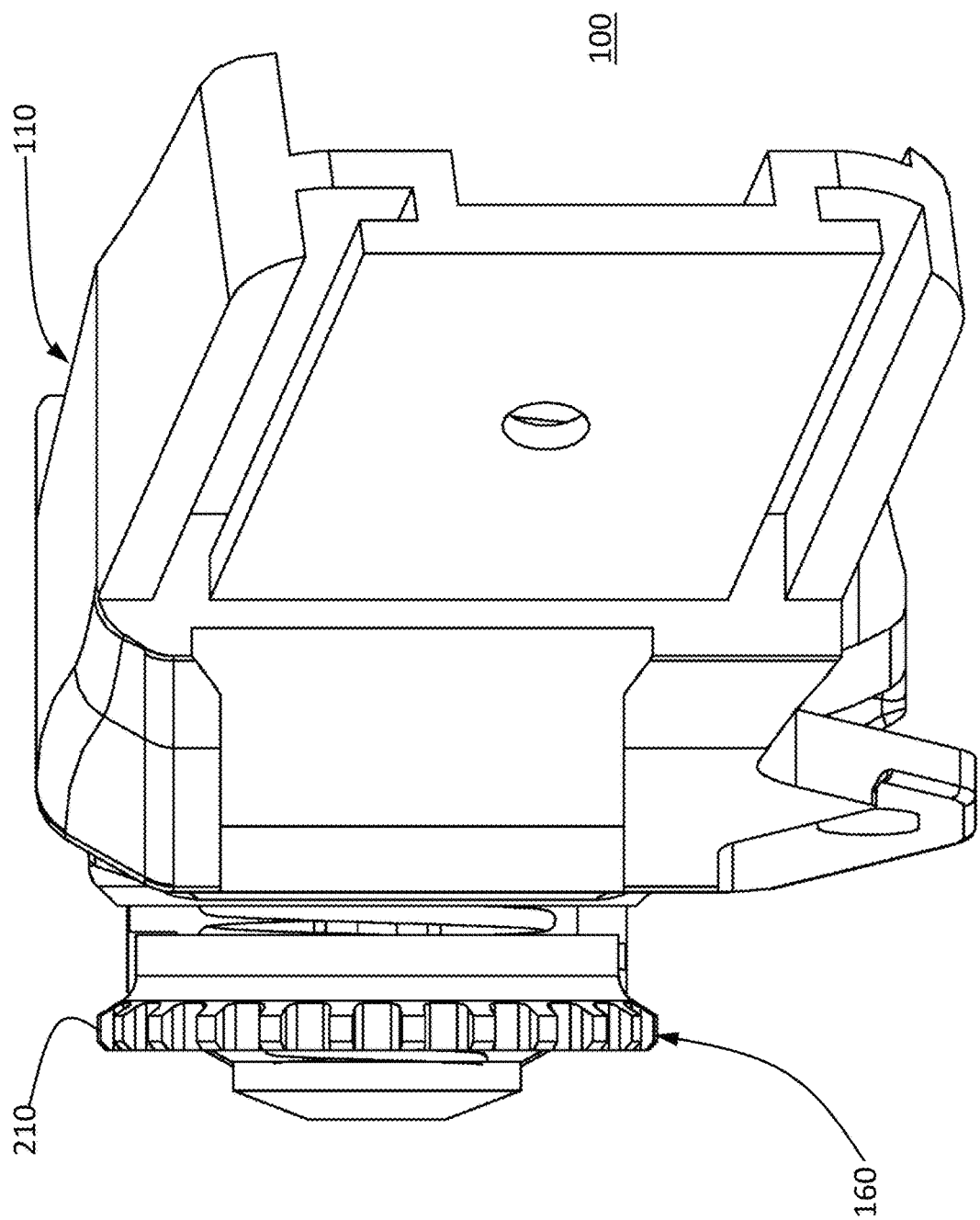
FIG. 10 is an enlarged rear view of the multispectral illumination device appearing in FIG. 1.
Figure 11:
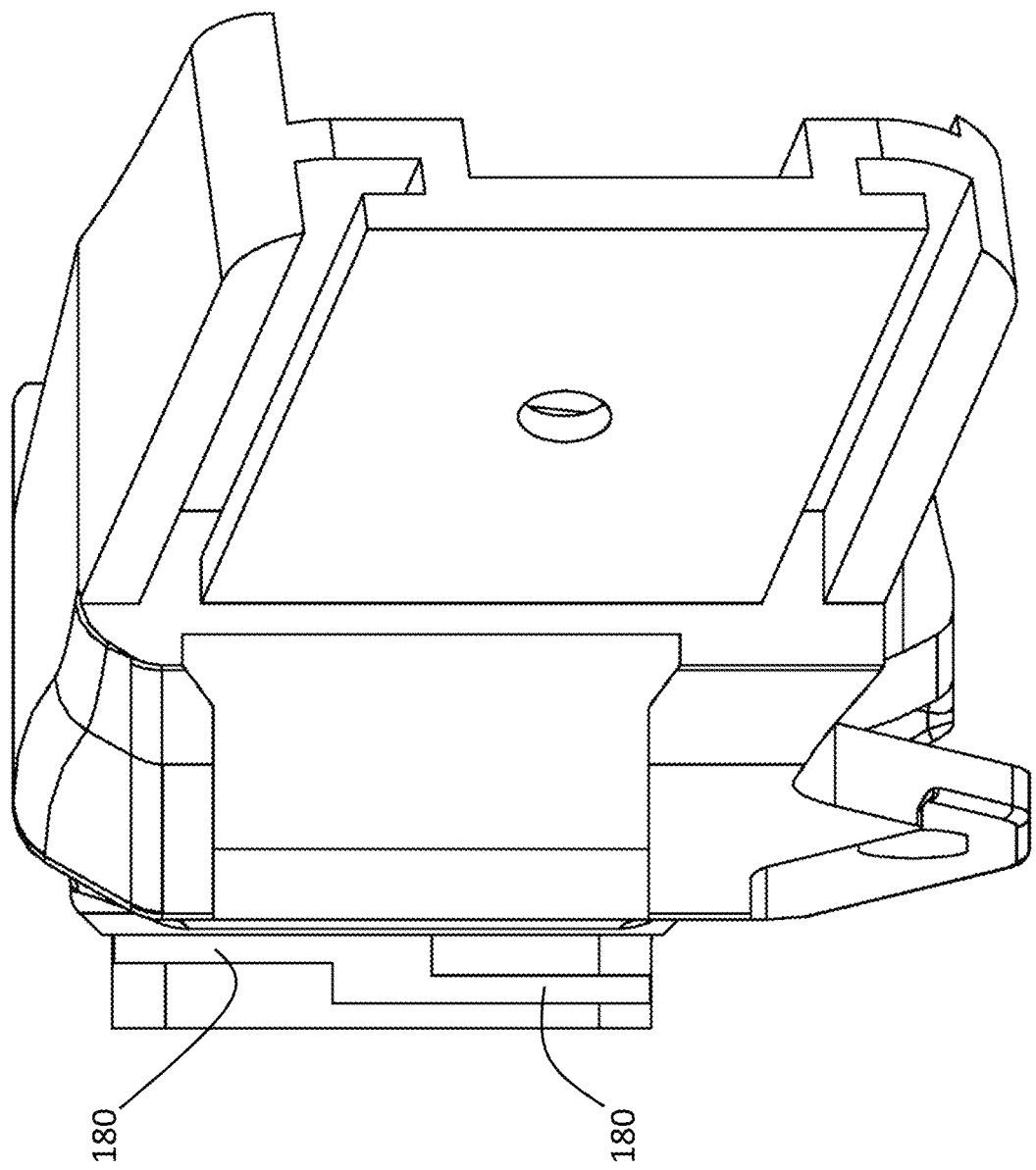
FIG. 11 is an enlarged rear view of the multispectral illumination device appearing in FIG. 1, with the selector knob removed for ease of illustration.

As shown in FIGS. 9-11, when the knob member 160 is in the "Off" position and the knob member 160 is in its natural position, the knob track guide 176 is axially offset from the knob track 180. The knob track 180 is three dimensional such that movement in either the clockwise or counterclockwise movement is prevented when the knob member 160 is in the "Off" position and the knob member 160 is in its natural position. To rotate the knob member 160 to position 1 or 2, the knob member 160 is pressed down, which allows the knob member 160 to be rotated in the clockwise direction to position 1 or 2. To rotate the knob member 160 to position 3 or 4, the knob member 160 is pulled up, which allows the knob member 160 to be rotated in the counterclockwise direction to position 3 or 4. In embodiments, as best seen in FIG. 10, the knob member 160 has an outward flange 210 to assist the user in pulling the knob member 160 away from the housing 110.

As best seen in FIGS. 14-17, an anti-rotation guide key 240 includes a collar portion 244 for engaging the stalk 140 and an anti-rotation arm 248 which is slidably received within an elongate anti-rotation track 252 formed within the housing 110. The arm 248 and track 252 cooperate to ensure that the user cannot twist or rotate the stalk 140 when it is in the extended or deployed position.

Figure 18:
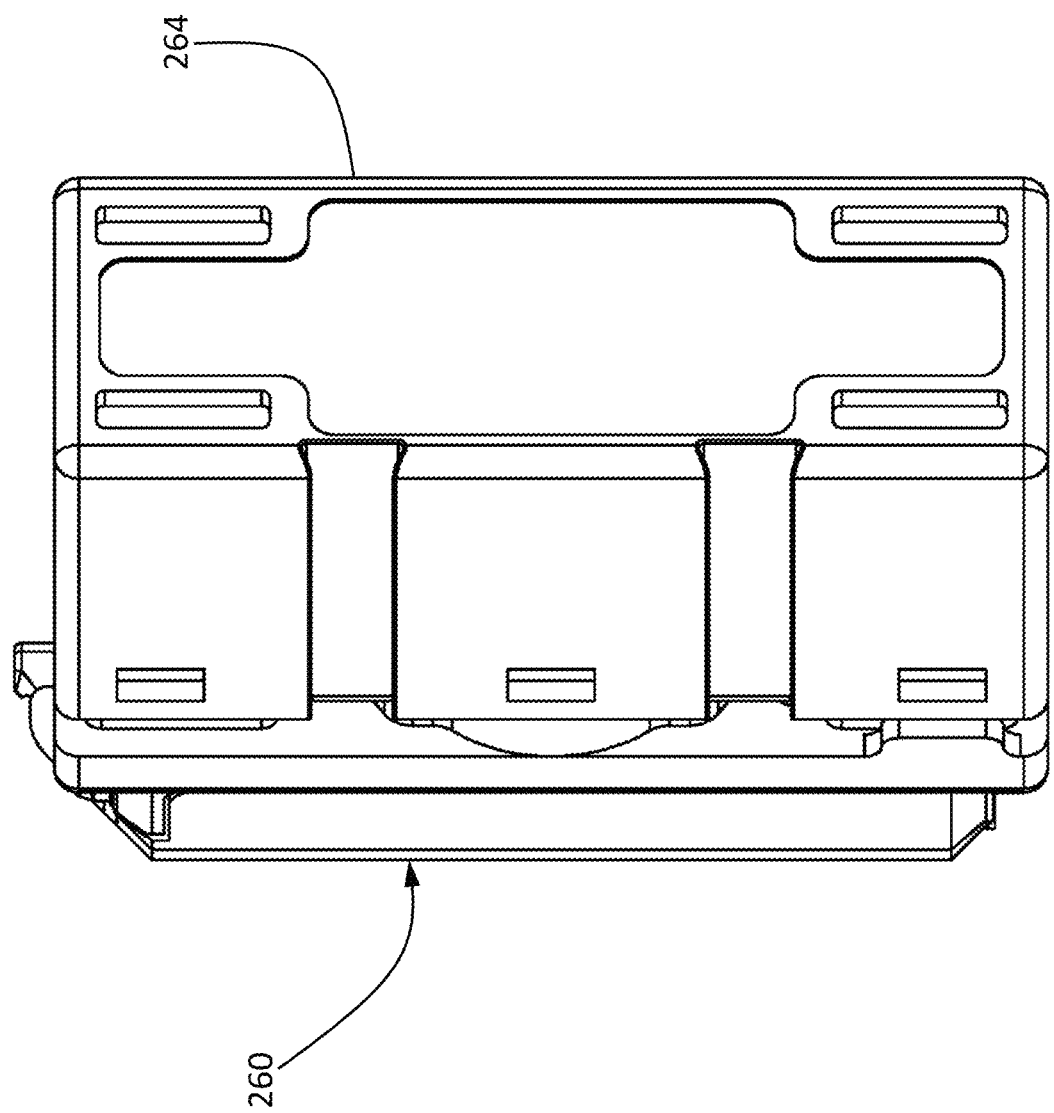
FIG. 18 illustrates an exemplary power, data, and control bridge device which is operable to provide power to the multispectral illumination device and connect to circuitry in the multispectral illumination device for programming the illumination function associated with each of the user selected knob positions.

FIG. 18 shows a bridge device 260 which is attached to one or more batteries 264. In the depicted embodiment, the battery 264 is a Small Tactical Universal Battery (STUB). The bridge 260 provides communication between devices associated with the helmet, such as one or more helmet accessory devices, a host computer system or central controller, or other computer-based information handling systems associated with the helmet. In the illustrated embodiment, the bridge 260 serves as a link for both power and data transfer to the multispectral illumination device 100. The bridge 260 utilizes a connected battery 264 to supply power to the multispectral illumination device 100. In embodiments, users can configure the multispectral illumination device 100 through a mobile app interface, inputting preferred light source and brightness settings that are transmitted to the multispectral illumination device 100 via the bridge 264. In embodiments where the bridge 264 is operably coupled to a host computer system, the multispectral illumination device 100 can be integrated with broader computing networks.

Figure 19:
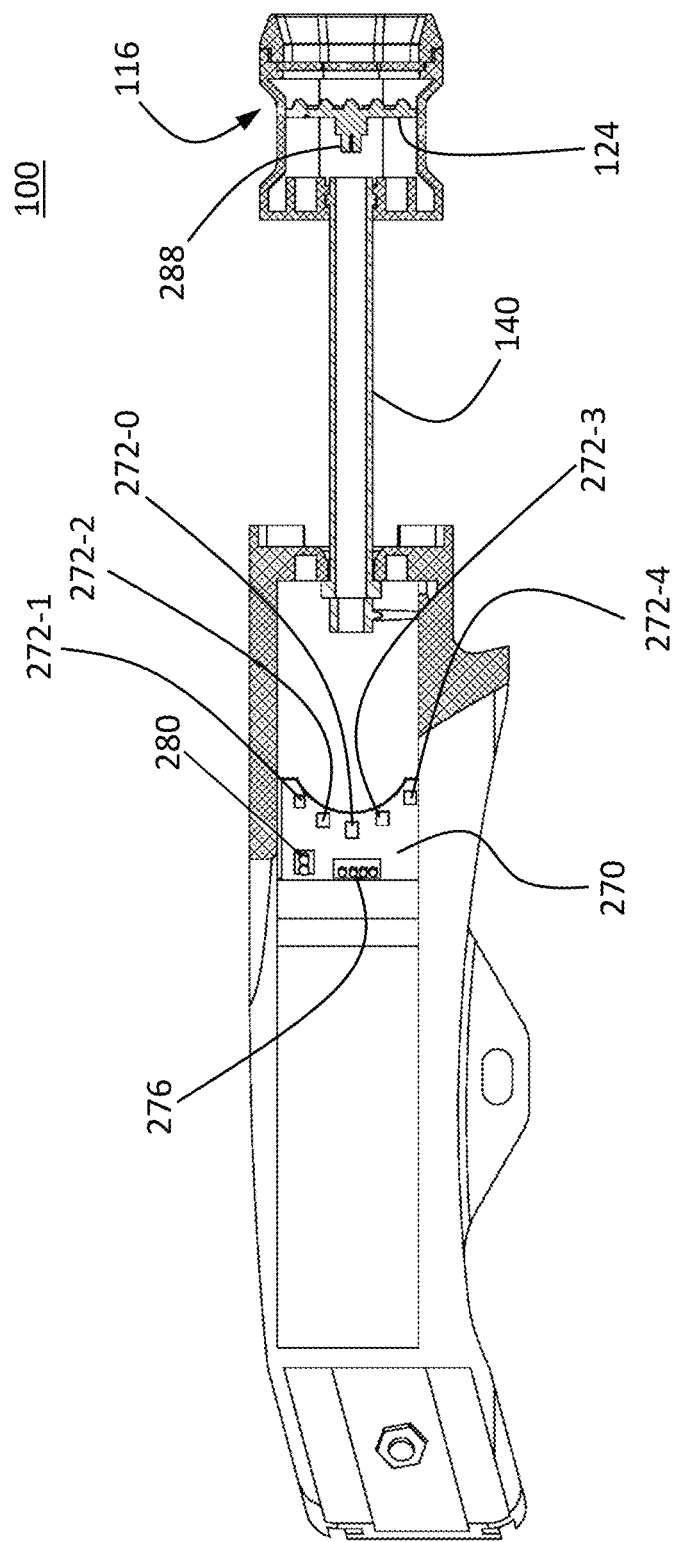
FIG. 19 is a left, partial cross-sectional view of the multispectral illumination device appearing in FIG. 1, with the retractable stalk in the extended position.

As shown in FIG. 19, the multispectral illumination device 100 includes a main circuit board 270. Knob position sensors or contacts 272-0, 272-1, 272-2, 272-3, and 272-4 are disposed on the circuit board 270 for detecting the position of the control knob assembly 132. A power and data connector 276 is provided to electrically couple the circuit board 270 to the bridge 260 (or, alternatively to a standalone battery or battery pack or other controller system). A power and data connector 280 is provided to electrically couple the circuit board 270 to the circuit board 124 in the illuminator head 116. Wires or cabling 284 (see FIG. 17) pass through the stalk 140 and extend between the connector 280 and a connector 288 on the illuminator head circuit board 124.

It will be recognized that the number of user selectable positions of the knob assembly 132 may be less than the number of available light sources, such that at least one light source option will not be conveniently available to the user. In operation, the operator should select which light sources are expected to be needed. It will also be recognized that the same light source could be selected for multiple positions of the control knob assembly 132. For example, two of the knob positions could be used for the same light source, e.g., at different brightness levels, to allow better performance for specific expected needs. For example, utilizing multiple knob positions for the same illumination source at different brightness levels allows the user to weigh battery life vs illumination intensity. Similarly, multiple knob positions could be used for the same light source to allow the user to readily select a brightness level suited for a given task, such as long range illumination for lighting up distant objects, room illumination for lighting up indoor spaces, and close-up illumination for inspection or other close examination where excessive brightness can be counterproductive.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A multispectral illumination device comprising:
    a main housing configured to be secured to a helmet;
    an illuminator head comprising a plurality of light sources, the plurality of light sources operable to emit light in multiple spectral regions;
    a selector located on the main housing for actuating one or more of the light sources within the plurality of light sources operable to emit light in a selected one of the multiple spectral regions; and
    a stalk passing through an opening in the main housing, the stalk having a first end coupled to the illuminator head and a second end opposite the first end received within the main housing, the stalk being slidable within the opening in the main housing to extend and retract the illuminator head toward and away from the housing, the stalk slidable between a fully extended position and a fully retracted position;
    wherein the selector comprises a knob assembly comprising:
    a manually rotatable knob;
    a bottom spring disposed between the manually rotatable knob and the main housing urging the manually rotatable knob away from the main housing;
    a knob positioning barrel affixed to the main housing and passing through an opening in the manually rotatable knob, the knob positioning barrel including an enlarged diameter portion;
    a top spring disposed between the manually rotatable knob and the enlarged diameter portion urging the manually rotatable knob toward the main housing, wherein the bottom spring and top spring cooperate to position the manually rotatable knob at a predetermined distance from the main housing;
    a knob track guide member formed on the manually rotatable knob and configured to run within a knob track formed on the main housing, wherein the knob track is configured to:
        block the manually rotatable knob from rotating when the manually rotatable knob at the predetermined distance from the main housing;
        permit the manually rotatable knob to rotate only in a first direction when the manually rotatable knob pulled against the bias of the top spring to a distance away from the housing which is greater than the predetermined distance from the main housing; and
        permit the manually rotatable knob to rotate only in a second direction opposite the first direction when the manually rotatable knob pushed against the bias of the second spring to a distance toward the housing which is less than the predetermined distance from the main housing.

2. The device of claim 1, further comprising:
    a first circuit board disposed within the main housing;
    a second circuit board disposed within the illuminator head, wherein the plurality of light sources are mounted on the second circuit board; and
    electrical conductors passing through an interior of the stalk electrically coupling the first circuit board and the second circuit board.

3. The device of claim 2, further comprising:
    an electrical connector coupled to the first circuit board, the electrical connector configured for connection to one or both:
        an external power supply; and
        an external computer-based information handling system.

4. The device of claim 1, wherein the selector includes a rotary knob rotatable to a plurality of positions for controlling operation of the plurality of light sources, the rotary knob rotatable to at least:
    an off position where no light source is illuminated;
    a first on position configured to operate a first subset of the light sources within the plurality of light sources, where the first subset of the light sources within the plurality of light sources emit light in a same spectral region; and
    a second on position configured to operate a second subset of the light sources within the plurality of light sources, where the first subset of the light sources within the plurality of light sources emit light in a same spectral region;
    wherein the first subset is the same as or different than the second subset.

5. The device of claim 4, further comprising detent elements for securing the rotary knob at each of the off position, the first on position, and the second on position.

6. The device of claim 1, wherein the main housing is configured to be attached to the helmet via one or both of:
    one or more threaded fasteners; and
    one or more hooks for engaging a brim of the helmet.

7. The device of claim 1, wherein the plurality of light sources includes:
    one or more white light emitters;
    one or more red light emitters;
    one or more UV light emitters;
    one or more NIR light emitters; and
    one or more SWIR light emitters.

8. The device of claim 1, wherein the stalk is an elongate flexible gooseneck structure which is manipulable to aim the illuminating head.

9. The device of claim 1, further comprising:
    an anti-rotation guide key within the main housing, the anti-rotation guide key including a collar coupled to the stalk and an arm extending from the collar to an elongate anti-rotation wherein the anti-rotation arm and the anti-rotation track cooperate to prevent rotation of the stalk in relation to the main housing.

10. The device of claim 1, further comprising:
    a processor and associated memory disposed within the main housing, the processor operably coupled to the associated memory;
    the associated memory configured to store one or more user presets; and the processor controlling the operation of the illumination head based on the one or more user presets.

11. The device of claim 10, wherein the selector has an off position and a plurality of operable positions, and further wherein the one or more user presets includes a set of user presets that are activated for each operable position within the plurality of operable positions.

12. The device of claim 11, wherein each set of user presets includes one or both of:
 a setting for selecting one or more light sources from within the plurality of light sources to be actuated; and
 a setting for a brightness level of the one or more light sources from within the plurality of light sources to be actuated.

13. The device of claim 10, wherein the user presets are configured to be programmed through connection to an external computer based information handling system.

14. The device of claim 10 wherein the user presets are configured to be programmed via a dedicated app running on a computer based information handling system selected from the group consisting of smartphones, smartwatches, and handheld computing devices.

15. A helmet system comprising, in combination, a helmet, and the multispectral illumination device of claim 1.

16. A multispectral illumination device comprising:
 a main housing configured to be secured to a helmet;
 an illuminator head comprising a plurality of light sources, the plurality of light sources operable to emit light in multiple spectral regions;
 a selector located on the main housing for actuating one or more of the light sources within the plurality of light sources operable to emit light in a selected one of the multiple spectral regions;
 a stalk passing through an opening in the main housing, the stalk having a first end coupled to the illuminator head and a second end opposite the first end received within the main housing, the stalk being slidable within the opening in the main housing to extend and retract the illuminator head toward and away from the housing, the stalk slidable between a fully extended position and a fully retracted position; and
 an anti-rotation guide key within the main housing, the anti-rotation guide key including a collar coupled to the stalk and an arm extending from the collar to an elongate anti-rotation wherein the anti-rotation arm and the anti-rotation track cooperate to prevent rotation of the stalk in relation to the main housing.

17. The device of claim 16, further comprising:
 a first circuit board disposed within the main housing;
 a second circuit board disposed within the illuminator head, wherein the plurality of light sources are mounted on the second circuit board; and
 electrical conductors passing through an interior of the stalk electrically coupling the first circuit board and the second circuit board.

18. The device of claim 17, further comprising:
 an electrical connector coupled to the first circuit board, the electrical connector configured for connection to one or both:
 an external power supply; and
 an external computer-based information handling system.

19. The device of claim 16, wherein the selector includes a rotary knob rotatable to a plurality of positions for controlling operation of the plurality of light sources, the rotary knob rotatable to at least:
 an off position where no light source is illuminated;
 a first on position configured to operate a first subset of the light sources within the plurality of light sources, where the first subset of the light sources within the plurality of light sources emit light in a same spectral region; and
 a second on position configured to operate a second subset of the light sources within the plurality of light sources, where the first subset of the light sources within the plurality of light sources emit light in a same spectral region;
 wherein the first subset is the same as or different than the second subset.

20. The device of claim 19, further comprising detent elements for securing the rotary knob at each of the off position, the first on position, and the second on position.

21. The device of claim 16, wherein the main housing is configured to be attached to the helmet via one or both of:
 one or more threaded fasteners; and
 one or more hooks for engaging a brim of the helmet.

22. The device of claim 16, wherein the plurality of light sources includes:
 one or more white light emitters;
 one or more red light emitters;
 one or more UV light emitters;
 one or more NIR light emitters; and
 one or more SWIR light emitters.

23. The device of claim 16, wherein the stalk is an elongate flexible gooseneck structure which is manipulable to aim the illuminating head.

24. The device of claim 16, further comprising:
 a processor and associated memory disposed within the main housing, the processor operably coupled to the associated memory;
 the associated memory configured to store one or more user presets; and
 the processor controlling the operation of the illumination head based on the one or more user presets.

25. The device of claim 24, wherein the selector has an off position and a plurality of operable positions, and further wherein the one or more user presets includes a set of user presets that are activated for each operable position within the plurality of operable positions.

26. The device of claim 25, wherein each set of user presets includes one or both of:
 a setting for selecting one or more light sources from within the plurality of light sources to be actuated; and
 a setting for a brightness level of the one or more light sources from within the plurality of light sources to be actuated.

27. The device of claim 24, wherein the user presets are configured to be programmed through connection to an external computer based information handling system.

28. The device of claim 24 wherein the user presets are configured to be programmed via a dedicated app running on a computer based information handling system selected from the group consisting of smartphones, smartwatches, and handheld computing devices.

29. A helmet system comprising, in combination, a helmet, and the multispectral illumination device of claim 1.

* * * * *